(No Model.)

S. L. WORSLEY.
TOOL POST FOR LATHES.

No. 536,845. Patented Apr. 2, 1895.

Witnesses:  Inventor.

UNITED STATES PATENT OFFICE.

SAMUEL L. WORSLEY, OF TAUNTON, MASSACHUSETTS, ASSIGNOR TO THE BROWN & SHARPE MANUFACTURING COMPANY, OF PROVIDENCE, RHODE ISLAND.

TOOL-POST FOR LATHES.

SPECIFICATION forming part of Letters Patent No. 536,845, dated April 2, 1895.

Application filed June 20, 1894. Serial No. 515,127. (No model.)

*To all whom it may concern:*

Be it known that I, SAMUEL L. WORSLEY, of Taunton, in the county of Bristol and State of Massachusetts, have invented certain new and useful Improvements in Tool-Posts for Lathes; and I do hereby declare the following specification, taken in connection with the accompanying drawings, forming a part of the same, to be a full, clear, and exact description thereof.

The object of the invention is to provide a tool-post for lathes and similar machines in which the vertical position of the tool may be readily and accurately adjusted, and the tool firmly held in any adjusted position.

To that end the invention consists in the combinations and arrangements of parts hereinafter described and claimed.

Figures 1, 2:
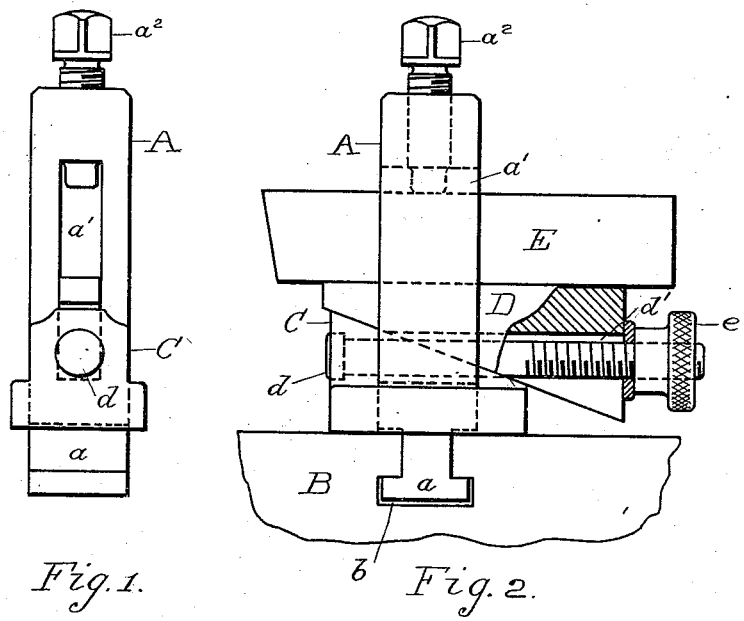
Figure 3:
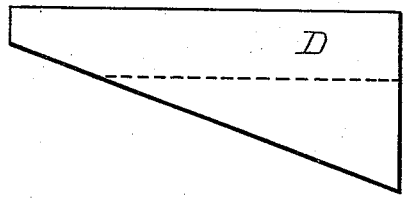
Figure 4:
Figure 5:
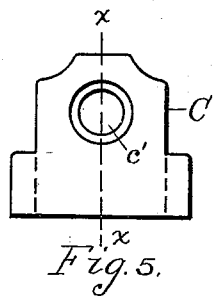
Figure 6:
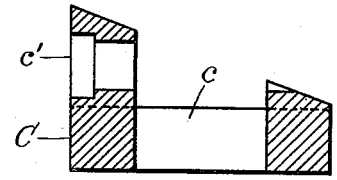

Referring to the drawings, Figure 1 is an end elevation of my improved tool-post. Fig. 2 is a side elevation of the same with the tool clamped therein, a portion of one of the parts being in section. Fig. 3 is a side elevation, and Fig. 4 an end elevation, upon an enlarged scale, of the adjustable wedge. Fig. 5 is an end elevation, likewise upon an enlarged scale, of one of the parts to be hereinafter described; and Fig. 6 is a section of the same on the line $x$, $x$, Fig. 5.

A represents the tool-post proper, which is provided with a T-end $a$ which engages the T-slot $b$ in the tool-slide B.

$a'$ is the tool-slot in the tool-post, which slot in the present case is made somewhat longer than usual, and $a^2$ is the clamp-screw.

Resting upon the top of the tool-slide is a loose block C having an inclined upper face. Through this block C there is a hole $c$, through which the lower end of the tool-post passes, as shown in Fig. 2. Another hole $c'$ countersunk at one end is formed in the block C for the reception of a headed screw $d$, which said screw is secured to said block so as to be held against turning therein. In the lower end of the elongated tool-slot $a'$ is arranged an adjustable wedge D, which is provided with a longitudinal slot $d'$ for the passage of the screw $d$. The inclined lower face of the wedge D rests upon the inclined upper face of the block C, and so that a longitudinal movement of said wedge in one direction or the other with relation to the block C, will serve to raise or lower said wedge in the tool-slot. A thumb-nut $e$ is screwed upon the free end of the screw $d$ with its face arranged to bear against the end of the wedge D. The tool E, when inserted in the tool-slot, rests upon the upper face of said wedge, and is clamped between said wedge and the clamp-screw $a^2$.

With the construction and arrangement of parts above described, and with the wedge D in the proper adjusted vertical position, when the tool E is inserted in the tool-slot and the clamp-screw $a^2$ set up, the tool will be firmly clamped and held in the desired position. If now it be desired to set the tool in a higher position, all that is necessary is to release the clamp-screw $a^2$ and turn the thumb-nut $e$, which will serve to force the wedge D up the inclined face of the block C, and thus to raise said wedge and the tool E. When the tool is brought to the proper position, the clamp-screw $a^2$ is again set up. When it is desired to adjust the tool to a lower position the thumb-nut is turned back, which will permit the necessary movement of the wedge to lower the tool, and the clamp-screw is set up to again clamp the tool.

With the construction and arrangement of parts above described the tool may be readily and accurately adjusted with the greatest nicety to any desired vertical position, and will be held firmly and securely in any and all adjusted positions.

What I claim as my invention, and desire to secure by Letters Patent, is—

The combination, with a tool-slide and tool-post, of a loose block resting upon said tool-slide, said block having an opening through which the tool-post passes, and being also provided with an inclined upper face, a screw secured to said block, an adjustable wedge co-operating with said inclined block and having a slot cut therein for the passage of said screw, and an adjusting nut upon said screw, the face of said nut being arranged to bear against the end of said wedge, substantially as described.

SAMUEL L. WORSLEY.

Witnesses:
W. H. THURSTON,
S. J. MURPHY.